(12) United States Patent
Martin (10) Patent No.: US 8,210,591 B2
(45) Date of Patent: Jul. 3, 2012

(54) VEHICLE UTILITY DECK AND STORAGE

(75) Inventor: Dave Martin, Parker, CO (US)

(73) Assignee: Damar Corporation, LLC, Parker, CO (US)

( * ) Notice: Subject to any disclaimer, the term of this patent is extended or adjusted under 35 U.S.C. 154(b) by 0 days.

(21) Appl. No.: 13/280,230

(22) Filed: Oct. 24, 2011

(65) Prior Publication Data

US 2012/0104062 A1 May 3, 2012

Related U.S. Application Data (63) Continuation of application No. 12/690,723, filed on Jan. 20, 2010, now abandoned, which is a continuation of application No. 12/134,510, filed on Jun. 6, 2008, now abandoned.

(60) Provisional application No. 60/942,253, filed on Jun. 6, 2007.

(51) Int. Cl.
*B60R 9/06* (2006.01)

(52) U.S. Cl. .................................. 296/37.6; 296/100.07
(58) Field of Classification Search ................. 296/37.6, 296/100.02–100.1, 37.14; 224/404
See application file for complete search history.

(56) References Cited

U.S. PATENT DOCUMENTS

2003/0057724 A1* 3/2003 Inagaki et al. ............... 296/37.8
* cited by examiner

*Primary Examiner* — Dennis Pedder
(74) *Attorney, Agent, or Firm* — Marsh Fischmann & Breyfogle LLP (57) ABSTRACT

A vehicle utility deck and storage system provides improved storage for bedded vehicles. In one embodiment, the deck system (104a) is positioned within the bed (108) of a pickup (102). The system (104a) includes a deck (114a) that substantially matches the dimensions and contours of the bed (108) and support legs (122) for supporting the deck system (104a) on the surface of the bed (108). The system (104a) further includes a number of removable storage bins (124) that can be accessed via hinged hatches (116a).

22 Claims, 10 Drawing Sheets

VEHICLE UTILITY DECK AND STORAGE

CROSS-REFERENCE TO RELATED APPLICATION

This application is a continuation of U.S. patent application Ser. No. 12/690,723, entitled "VEHICLE UTILITY DECK AND STORAGE," filed on Jan. 20, 2010, which is a continuation of U.S. patent application Ser. No. 12/134,210, entitled "VEHICLE UTILITY DECK AND STORAGE," filed on Jun. 6, 2008, now abandoned, which claims priority from U.S. Provisional Application No. 60/942,253, entitled, "VEHICLE UTILITY DECK AND STORAGE," filed on Jun. 6, 2007, the contents of which are incorporated herein as if set forth in full.

FIELD OF INVENTION

The present invention is generally directed to improving storage capabilities for bedded vehicles, e.g., pickup trucks, vans, SUVs or other vehicles having a bed for hauling cargo or the like. In particular, the invention relates to a system and associated methodology for providing a second deck, above the base bed surface of the bedded vehicle, and multiple storage spaces between the base bed surface and second deck that can be accessed by hatches in the second deck.

BACKGROUND OF THE INVENTION

One of the principal attractions of bedded vehicles is their utility in storing and hauling a variety of cargo such as materials, equipment, tools, vehicles (e.g., ATVs, motorcycles, snowmobiles, etc.) or other cargo items. Because of this utility, bedded vehicles have gained acceptance for a variety of classes of customers and applications. For example, outdoorsmen such as hunters and campers may use a pickup truck to haul an ATV, camping equipment, hunting equipment and game. Other individuals may use a bedded truck to haul tools, groceries and other merchandise, furniture and other items as needs arise. A variety of workmen, such as electricians, plumbers, network installation and repair technicians, etc., may use bedded trucks to store, organize and haul a collection of tools, parts and equipment. Indeed, employers may operate large fleets of such vehicles.

Bedded trucks as delivered by the manufacturer today are not necessarily well-suited to address all the needs of various users as noted above. The case of pickup trucks is illustrative. The beds of pickup trucks typically define a large, unitary cargo space. Though a flexible or hard cover may be provided, either as original equipment or as an after-market product, as a practical matter, such covers are often either not used at all or only used between hauling occasions. Pickup trucks are thus well-suited to certain applications such as hauling bulk materials or vehicles, equipment or furniture that can be secured to the deck or bed sidewalls.

However, pickup trucks are less well-suited for other applications where it is desired to collect, organize and haul a variety of items. For example, outdoorsmen and workmen as noted above may have a variety of tools, equipment, parts, etc. to collect in the bed. A large, unitary bed makes it hard to organize and secure such items. Moreover, an open bed may expose such items to the elements. In addition, an open bed leaves such items visible to and accessible by passersby, thus raising a security concern. Even if a cover is available, the cover is often inconvenient to use and may allow visibility to such items.

Various products have been proposed to address some of these issues. For example, a large after-market has arisen for tool boxes that can be installed on pickup truck beds. Typically, these are large boxes (e.g., extending across most of the width and/or length of the bed) that are secured to the bed or bed sidewalls by bolts or the like. These tool boxes are effective in securing tools but generally have limited utility for organizing and storing a collection of items. Moreover, installation may require penetration of deck surfaces or otherwise entail significant effort. Accordingly, these tool boxes are typically installed on a substantially permanent basis. In addition, because the boxes usually consist of one large open storage area and are affixed to the truck bed, a workman may be required to make multiple trips between the toolbox and a worksite as items from the toolbox are required.

Some workmen who require access to a substantial inventory of parts and equipment use customized vans or pickups with toppers to provide greater storage customization. However, in some cases, these vehicles allow passersby to view inside, raising security concerns. In addition, these vehicles may be inconvenient to use as a workman may be required to go into and out of the vehicle many times to retrieve needed items. They can also be inconvenient for fleet managers who need to keep all of the vehicles stocked. For example, if the vehicles are deployed for a series of jobs each day, the vehicles may not be available to be stocked for a day's jobs until the end of the previous work day.

SUMMARY OF THE INVENTION

The present invention is directed to vehicle utility deck and storage system ("deck system") for bedded vehicles. The deck system provides a number of secure storage bins in the vehicle bed without sacrificing deck space for hauling vehicles or other large items. In a preferred implementation, storage bins can be securely held for convenient access in the deck system and removed, for example, for use at a work site or to otherwise transport items into a residence or other building. Moreover, interchangeable removable bins can be used to quickly restock or re-purpose a vehicle, e.g., to switch between work gear and camping gear or to pre-stock bins while a vehicle is out on another job. Moreover, the deck system can be readily installed and uninstalled in a truck bed without damage or compromising the integrity of the bed. The invention thus substantially expands the utility of bedded vehicles for many applications.

In accordance with one aspect of the present invention, an apparatus is provided for enhancing the utility of a bed area of a motorized vehicle. The apparatus includes structure defining a secondary deck surface dimensioned to generally correspond to at least a portion of a primary bed surface of the motorized vehicle and support structure for supporting the secondary surface. The secondary surface structure, which may be formed as a unitary structure or in multiple pieces, preferably defines a number of openings that are covered by hinged hatches. The hatches may be opened from a side of the vehicle or back of the vehicle. In addition, a tailgate hatch may be provided at a rear end of the secondary surface structure. The support structure supports the secondary surface in a raised, separated position in relation to the primary bed surface so that at least one storage space is defined between the secondary surface and the primary bed surface. The apparatus may be provided as original equipment or as an after-market product.

In accordance with another aspect of the present invention, a motorized vehicle includes removable storage bins. Specifically, the vehicle includes a cargo bed having a bed surface, at least one removable storage bin extending from the bed surface, and access structure extending through the bed surface for accessing the storage bins. For example, the bed surface may be a primary bed surface or a secondary deck disposed above a primary bed surface, as discussed above. In this manner, items can be conveniently organized and stored beneath the deck surface and transported to a separate location such as a work site when desired. In this regard, interchangeable storage bins may be utilized, for example, so that work items can be readily exchanged with leisure items or to allow for preloading materials needed for a subsequent job when the vehicle is currently dispatched on a current job.

In accordance with a still further aspect of the present invention, a method is provided for enhancing storage of items in a bed area of a motorized vehicle. The method comprises the steps of providing a secondary surface structure defining a secondary surface dimensioned to correspond to at least a portion of the primary bed surface of the motorized vehicle, and disposing the secondary surface structure in the bed area of the motorized vehicle so that the secondary surface is disposed in a raised, separated position in relation to the primary bed surface.

The secondary surface structure may be provided in first and second portions. For example, the first and second portions may be mirror image left and right portions. In this regard, the noted step of disposing may involve placing the first portion of the secondary surface structure in the bed area, placing the second portion of the secondary surface structure into the bed area, and attaching the first and second portions of the secondary surface structure. The noted method may further involve the step of securing the secondary surface structure to a bed of the motorized vehicle free from modification of the motorized vehicle for the purpose of securing the secondary surface structure thereto. For example, the secondary surface structure may be dimensioned to be securely received in the bed. Alternatively, fasteners may be used to secure the secondary surface structure to the bed.

In accordance with a further aspect of the present invention, a method is provided for using a motorized vehicle. The method involves: providing a secondary surface structure defining a secondary surface dimensioned to correspond to at least a portion of a primary bed surface of the motorized vehicle; opening a cover to expose an opening extending through the secondary surface; inserting a storage item through said opening into the storage space; and closing the cover to substantially enclose the storage space. Preferably, the secondary surface is disposed in a raised, separated position in relation to the primary bed surface. A storage bin may be inserted into and removed from the storage space as desired. Multiple storage bins, e.g., exceeding the number of storage spaces or hatches, may be utilized to provide a system that can be readily restocked or repurposed. The method may further include the step of locking the cover in the closed position.

BRIEF DESCRIPTION OF THE DRAWINGS

For a more complete understanding of the present invention and further advantages thereof, reference is now made to the following detailed description, taken in conjunction with the drawings in which.

DETAILED DESCRIPTION

The present invention is generally directed to a deck system for a bedded vehicle, such as a pickup truck, van or SUV, and associated methodology. In the following description, the invention is set forth in the context of original equipment or an after-market deck system for installation in or on the bed of a pickup truck. This is believed to be a particularly advantageous application of the present invention. However, it should be appreciated that the invention is not limited to this context. Accordingly, the following description should be understood as exemplary and not by way of limitation.

Figure 1A:
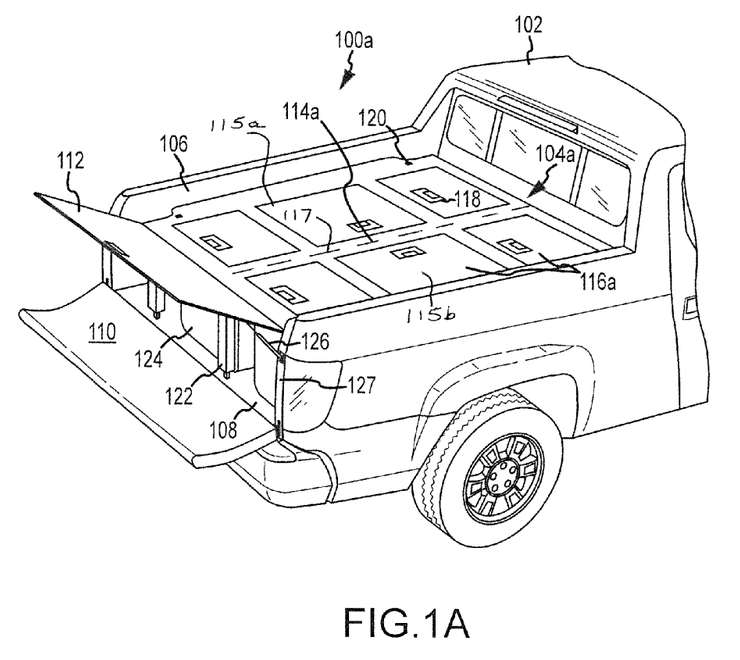
FIGS. 1A-1E show various configurations of a pickup truck with deck and storage systems in accordance with the present invention.
Figure 1B:
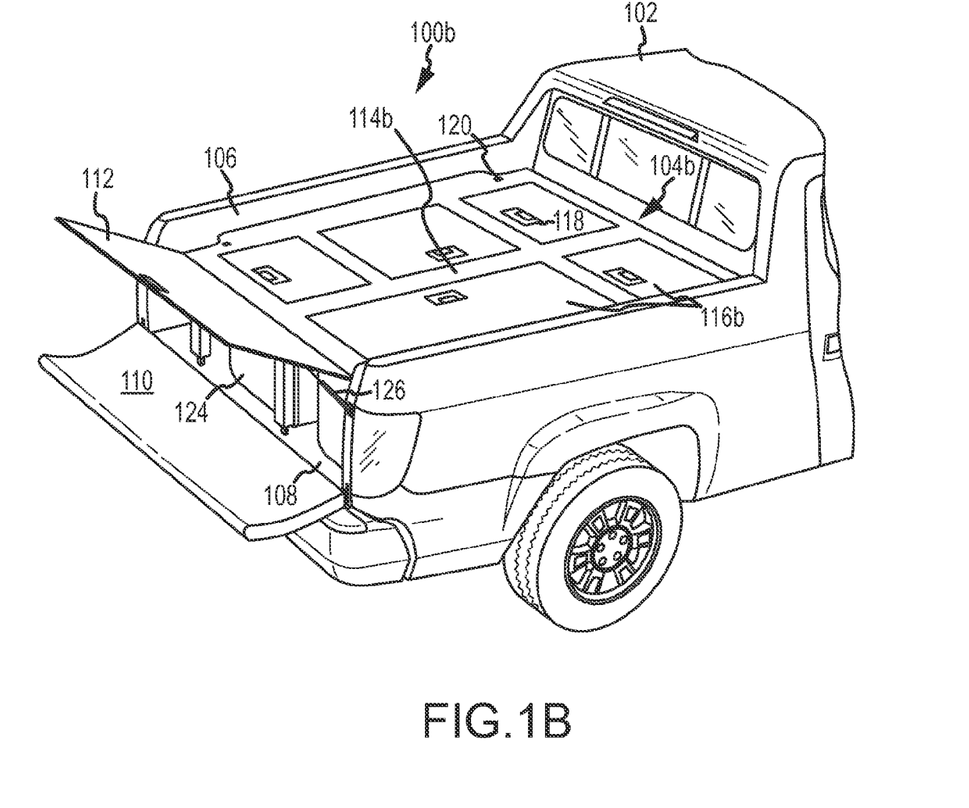
Figure 1C:
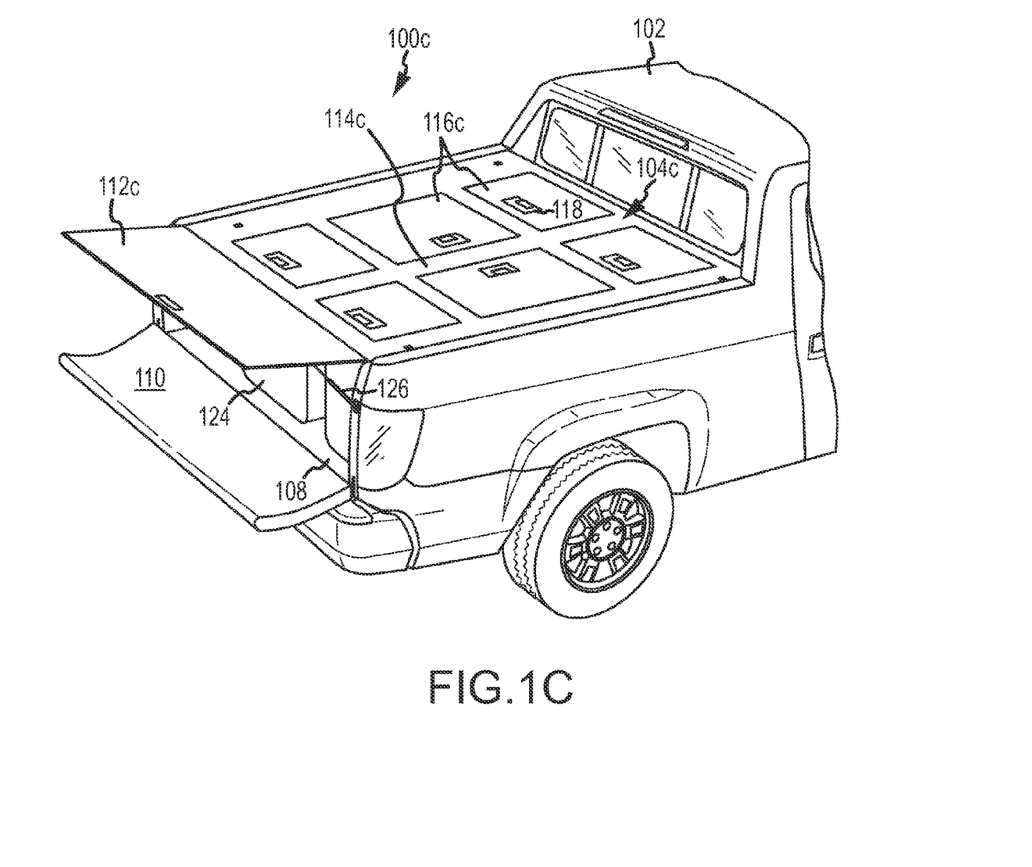

Referring to FIGS. 1A-1E, various configurations of a truck 100a-100e in accordance with the present invention are shown. In FIGS. 1A-1C, like items are identified by like reference numerals. Corresponding items with different configurations as between the figures are identified with the same numeral but different letter designation.

Referring first to FIG. 1A, the illustrated truck 100a includes a deck and storage system 104a ("deck system") positioned within the bed 108 of a pickup 102. The deck system 104a may be provided as an after-market product or may be installed in the bed 108 by the pickup manufacturer and sold together with the pickup 102. In either case, the system 104a may be designed to allow for easy installation into the bed 108 and removal therefrom (uninstallation) as may be desired. Alternatively, the system 104a may be permanently attached to the bed 108 as by welding or detachably interconnected to the bed 108 as by bolts or, more preferable, non-penetrating clamps or turn buckles or the like that can secure the system 104a without requiring penetration of the bed 108. In the illustrated embodiment, the deck system 104a is removably installed in the bed 108 in a manner that does not damage or modify the bed 108 in any way. Specifically, the deck system 104a includes a deck 114a that substantially matches the dimensions and contours of the bed 108 and support legs 122 for supporting the deck system 104a on a surface of the bed 108. In this manner, the deck system 104a is securely retained in the bed 108 without requiring penetration of any deck surface or other attachment to the bed 108. It will be appreciated that this allows for convenient installation and uninstallation as well as preserving the integrity and appearance of the bed 108.

The illustrated deck system 104a includes a deck 114a, as noted above, and a number of hatches 116a. The hatches 116a are attached to the deck 114a by hinges and can be moved between an open configuration and a closed configuration by gripping the handles 118. In the illustrated deck system 104a, some of the hatches 116a have a hinge line oriented along a front-to-back axis of the bed 108 (so that the hatches open to allow easy access from the side of the pickup 102) and others have a hinge line oriented from side-to-side.

The handles 118 may be, for example, T-shaped or U-shaped handles and preferably can be moved between stowed and deployed configurations. In the stowed configuration, the handles 118 are preferably withdrawn into recesses on the surface of the hatches 116a. When deployed, the handles preferably rotate out of the recesses for easy handling. Similarly, the hatches 116a are preferably mounted on the deck 114a such that, when the hatches 116a are in the closed configuration as shown, the upper surfaces of the hatches 116a are substantially flush with the upper surface of the deck 114a. In this manner, the deck 114a and hatches 116a collectively define a substantially flat deck surface. This deck surface can be used to support cargo, materials, vehicles (such as an ATV, motorcycle, snow mobile, etc.) as may be desired. Accordingly, the advantages of the system 104a as discussed herein are achieved without sacrificing the ability of the truck 100a to be used for hauling purposes.

Figure 6:
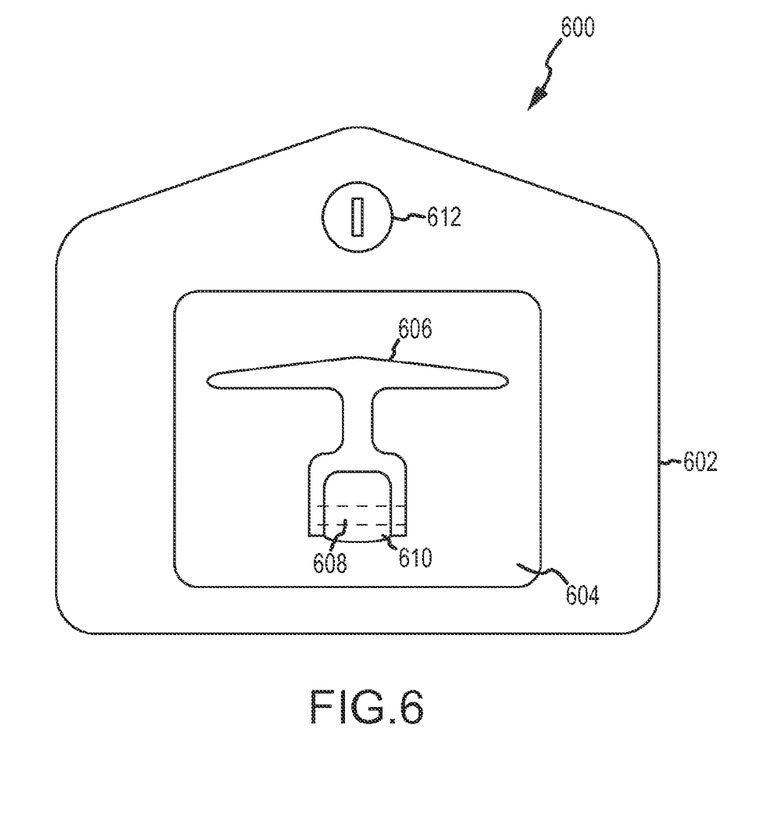
FIG. 6 is a top view of a handle assembly of the deck system of FIG. 1A.

An example of a suitable handle assembly 600 is shown in FIG. 6. The handle assembly 600 includes a face plate 602 having a recess 604 formed therein. A handle 606 is attached to a block 610 via a pivot pin 608. When the handle 606 is in the stowed position as shown, it is substantially fully contained within the recess 604 so that it does not protrude from the deck 114a (FIG. 1). The handle 606 can be rotated away from the plate 602 to facilitate gripping to open and close the hatch 116a. The illustrated assembly 600 further includes a lock 612 for securely locking the hatch 116a.

Referring again to FIG. 1, the illustrated deck system 104a also includes an optional tailgate hatch 112. The tailgate hatch 112 can be lifted, as shown, to allow access to the space between the deck 114a and the surface of the pickup truck bed 108. This space may be accessed, for example, for additional storage as will be understood from the description below. In addition, the tailgate hatch 112 can be moved to a closed position and locked in the closed position so that items can be securely stored beneath the deck 114a. In addition, the tailgate hatch 112 is useful for vehicles that do not have a truck tailgate 110 or have a non-locking tailgate 110. One or more cylinders 126 mounted on a depending portion 127 of the deck 114a can conveniently hold the tailgate hatch 112 in the open position. The tailgate batch 112 as well as the hatches 116a can be attached to the deck 114a by slide-on hinges for easy attachment and detachment as may be desired.

A number of additional features of the system 104 a can be seen in FIG. 1A. In this regard, the illustrated system 104a includes one or more removable storage bins 124 for retaining items that are inserted into the bins 124. As will be discussed in more detail below, these bins 124 are preferably suspended from the deck 114a such that the bottoms of the bins 124 are above the surface of the bed 108. This allows for storage of items, e.g., plywood, pipes, ropes or chains, sporting equipment, etc., on the surface of the bed 108 beneath the bins 124. In addition, this arrangement provides simple access to the items stored in the removable bins 124 via the hatches 116a and provides some degree of weather proofing of the bins 124. The illustrated system 104a further includes a number of tie downs 120 on the upper surface of the deck 114a so that equipment can be secured on the deck 114a.

It will be appreciated that the configuration shown in FIG. 1A is only one example of possible configurations in accordance with the present invention. In particular, the position of the deck 104a in relation to the pickup truck bed 108, as well as the configuration of the hatches 116a, can be varied as desired. FIGS. 1B and 1C show more examples in the regard. The system 104b of FIG. 1B includes a different configuration of the deck 114b and hatches 116b than was shown in FIG. 1A. In particular, the hatches are not symmetrical about a centerline of the deck 114b, and multiple different size hatches 116b are provided. It is noted, in this regard, that different configurations may be preferred for different applications. Thus, for example, in certain fleet applications, such as electricians, plumbers, cable network technicians, etc., it may be preferred to have a larger number of smaller hatches 116 for storing a variety of smaller parts and tool cases. By contrast, for certain outdoor activities, such has hunting and camping, one or more larger hatches 116 may be desired for storing larger items such as tents, sleeping bags, camping stoves, game bags, etc. It is thus anticipated that different configurations may be preferred by different customers or classes of customers.

FIG. 1C shows a further configuration where the deck 114c of the system 104c is mounted so that the surface of the deck 114c is substantially flush with or slightly above the top of the bed 108. This may be preferred, for example, so as to allow for deeper storage bins 124 or more storage space beneath the storage bins 124 in the bed area. Moreover, such an arrangement allows the deck 104c to rest on or be mounted to the sides 106 (See, FIGS. 1A and 1B) of the bed 108 (e.g., on the tops of the sidewalls). This, in turn, can avoid the need for support legs on the surface of the truck bed, which may interfere with hauling large panels or the like.

Figure 1D:
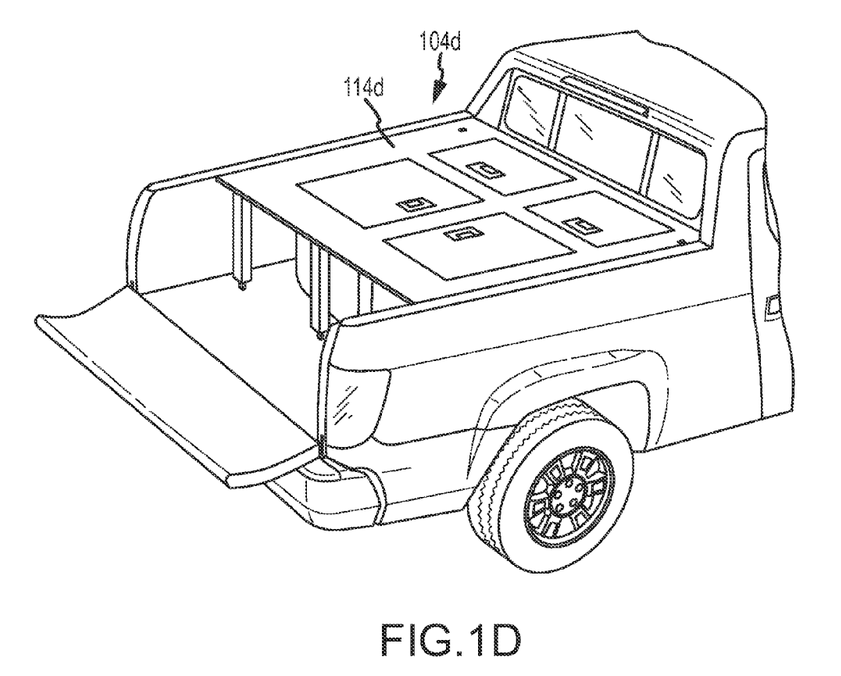
Figure 1E:
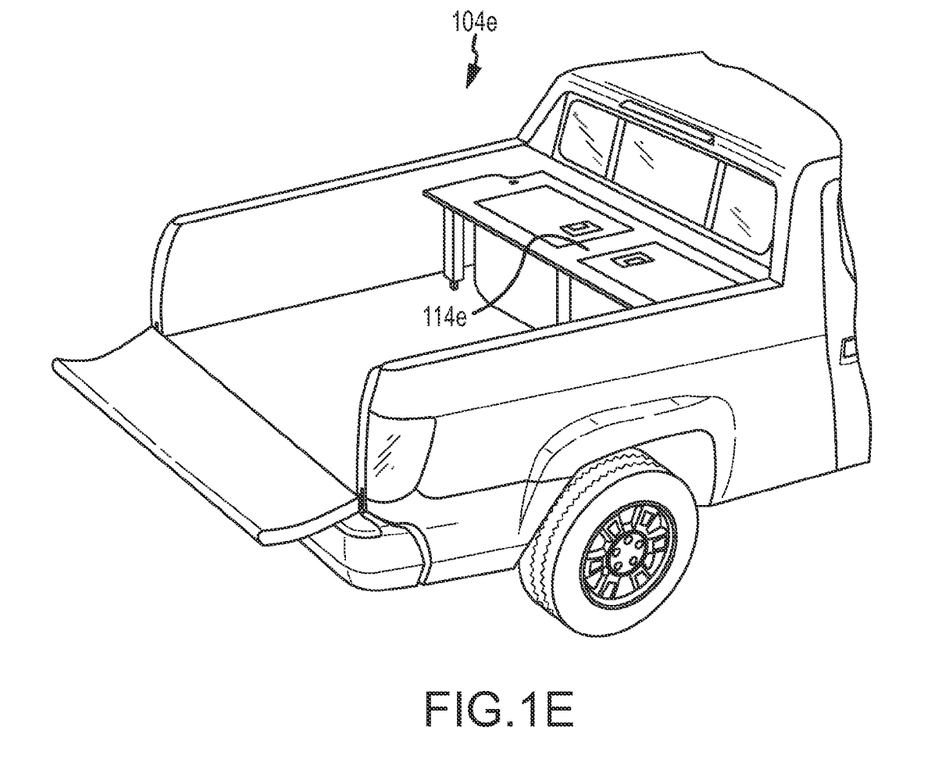

It will be appreciated that the system need not extend across the full length and width of the bed. FIGS. 1D and 1E show examples of systems 104d, e in this regard. Specifically, system 104d has a deck 114d that is flush with the tops of the side walls, a length less than the length of the bed and different hatch size/orientation. System 104e has a deck 114e below the tops of the sidewalls, a length less than the length of the bed and, in this case, side-facing hatches. It will be appreciated that the system may alternatively or additionally be less than the full width of the bed (e.g., corresponding to only the left or right half of the systems of FIGS. 1A-1C). In addition, the system may be constructed so that one or more of the bins can be removed by sliding it out of the deck support structure as an alternative to lifting the bins out through the hatch opening. For example, the rearmost bins adjacent the tailgate, or any other bin positioned so that it is not closed-in by the bed structure, could be inserted or removed in this fashion. This can be accomplished, for example, by leaving the bin support structure of the deck open on the appropriate side (e.g., the back-facing or center facing side) to allow sliding of the bin. If desired, drawer slide mechanisms may be utilized to facilitate sliding and/or limit travel of the bins.

Figure 2A:
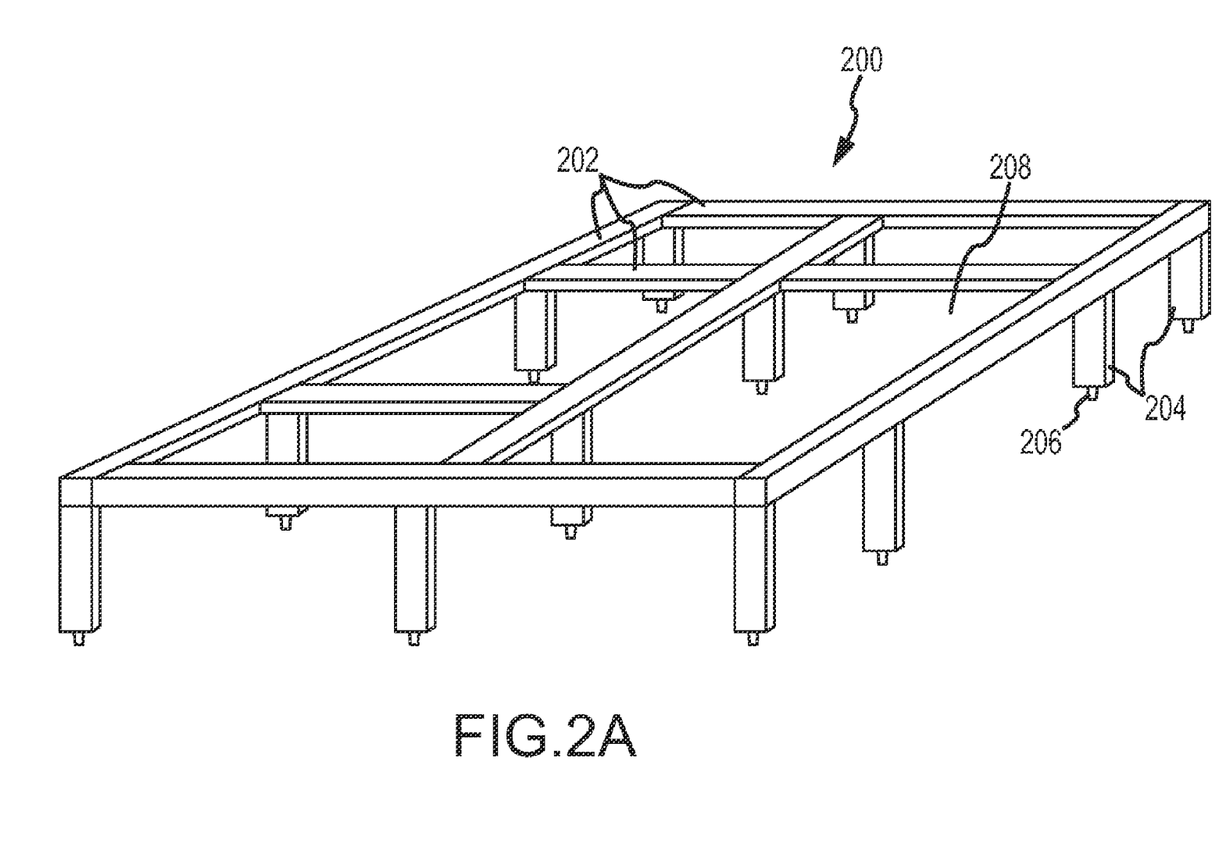
FIGS. 2A-2B show perspective and top views of a framework of the deck system of FIG. 1B.
Figure 2B:
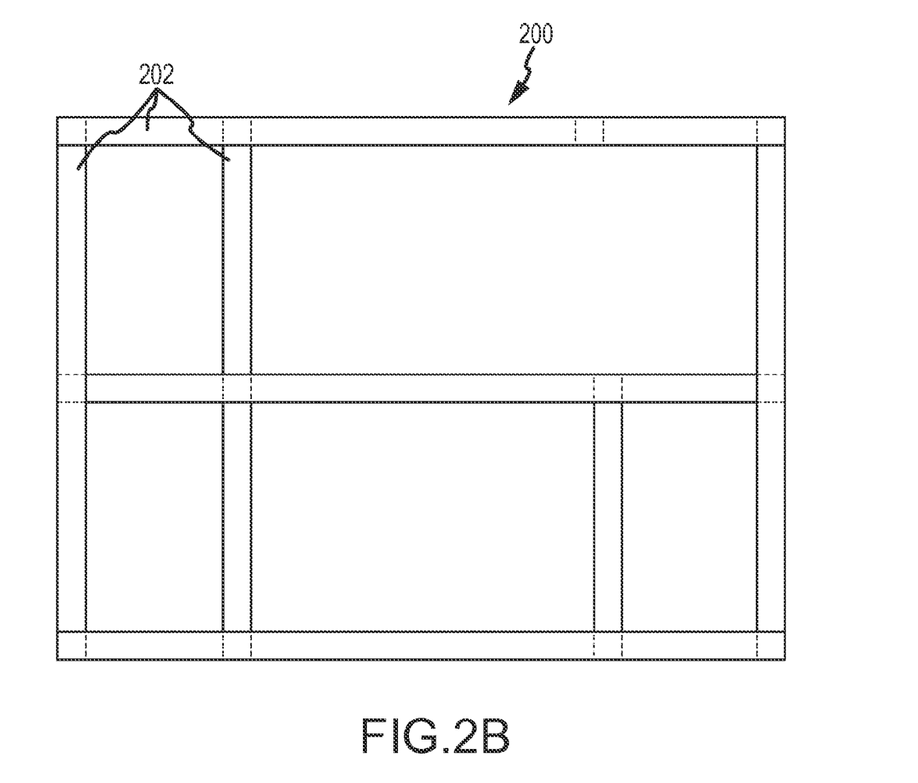

FIGS. 2A and 2B show a support framework that may be used to support the deck of the systems described above. The framework 200 is particularly configured for use in connection with hatches as shown in FIG. 1B. The framework 200 is formed from a number of horizontal support members 202 and a number of vertical support legs 204. The horizontal members 202 are preferably positioned to extend between the hatches so as to not interfere with access to items stored within the hatches. The deck 114 (FIGS. 1A-1C) can be attached to the horizontal members by bolts or the like that allow for easy assembly and disassembly of the system. The framework 200 may be provided separate from the deck or may be pre-connected thereto. For example, for convenient shipping and assembly, the horizontal support members 202 may be pre-assembled to the underside of the deck or deck segments. As a further alternative, some of the horizontal members (e.g., the lengthwise members) may be pre-assembled to the deck and others (the crosswise members) may not.

The illustrated support legs 204 may include leveling elements 206 such as threaded footings. The leveling elements 206 can be extended or retracted in relation to the support legs 204 to ensure that each of the support legs 204 contacts the surface of the bed, which may not be flat. For example, pickup truck beds often include channels or other contours. Some or all of the support legs 204 may be removable or pivotable (e.g., up against the underside of the horizontal members 202). For example, the center legs (those disposed near the front-to-back centerline of the bed midway between the sidewalls) may be uninstalled or pivoted up and out of the way when it is desired to slide large panels under the deck, and reinstalled or pivoted down to support heavy items (e.g., vehicles) on the deck.

The illustrated framework 200 further includes an optional separator panel 208 that extends from the horizontal members 202 substantially to the bed surface. Such separator panels 208 may be used to allow for convenient separation of the spaces associated with different ones of the hatches. In this regard, separator panels may extend from front to back or from side-to-side in any configuration desired by customers.

The framework may be formed in a telescoping fashion to accommodate use in connection with a variety of vehicles having different sized beds. For example, connectors can be provided at the intersections of the horizontal members 202 to receive the members in a telescoping relationship. These connectors may be formed as "+" or "T" shaped connectors that slidably receive the members 202 in the legs thereof. The deck can also be formed from segments that telescope to adjust to different sized beds. A substantial degree of adjustability of the overall dimensions of the framework can thus be achieved. The members can be secured to the connectors in the desired configuration by nuts other connectors. Preferably, all connections of the framework and deck can be accomplished without tools, such as by use of wing-nuts or the like.

As an alternative to the illustrated framework 200, the crosswise horizontal members may be omitted and four (rather than three, as illustrated) lengthwise horizontal members may be used at the outside edges adjacent the sidewalls as shown, and substantially side-by-side or slightly spaced lengthwise members maybe provided near the front-to-back centerline of the bed. This has been found to provide sufficient strength for a variety of applications and accommodates various hatch configurations. Moreover, when combined with a deck formed in left and right segments, this allows for use of only one half of the system when desired.

The material selected for construction of the framework, the deck and the storage bins, as well as the thicknesses of materials used, may be selected depending on a number of factors. These factors relate to, for example, expense of production, required strength, various performance properties and appearance. For example, as noted above, it may be desired to secure a vehicle such as an ATV, motorcycle or snowmobile on the decking surface. Such applications may require that the system be rated to support substantial weight. This, in turn, may require that sturdy materials are used for the framework and deck and that a sufficient number and spacing of support legs is provided. In other cases, such weight support may not be necessary, and the customer may prefer a lightweight system that can be more easily removed from the truck bed when desired. In such cases, the preference may be for lighter materials. In still other cases, the most important criteria may relate to weather resistance. Also, the materials may be chosen for appearance or coated to provide a desired appearance (e.g., a camouflage pattern for hunters or coated to match the color of the pickup's bed or exterior). Non-slip or other coatings may also be desired.

The illustrated system accommodates a broad range of such objectives. The system is lightweight so as to enable easy installation and uninstallation and yet strong so as to accommodate high load applications such as supporting a vehicle on the upper surface of the deck. Specifically, the deck may be formed from, for example, steel, aluminum, fiberglass, polymers or other composites. In the illustrated embodiment, the deck is formed from diamond plate aluminum. The thickness depends on the desired weight rating, but may be between about 0.05-0.25 inches. The framework, including the horizontal members 202 and the support legs 204, may be formed, for example, from steel, aluminum, fiberglass, polymer or other composite. The components can be solid, hollow, flat or various configurations. In the illustrated embodiment, the members 202 and legs 204 are generally square-shaped or rectangular hollow aluminum tubes having a width and length of about 1-3 inches and a wall thickness of between about 0.05-0.25 inches. The storage bins may be formed from any suitable material such as any of various plastics.

The deck may be formed in one or multiple segments that are attached to form the completed deck. For example, the deck may be formed in two symmetrical pieces that meet at the front-to-back centerline (as indicated at 117) of the bed. This is useful to reduce the weight of the pieces 115a, 115b (See. FIG. 1A) and to simplify assembly as the deck may match the curved contours of the bed side walls and its size, when assembled, may exceed the dimensions of the tailgate hatch and/or the bed top opening. In addition, such segmentation is convenient for shipping and storage. The seam between the halves may be supported by the framework, as shown in FIG. 2.

Figure 3:
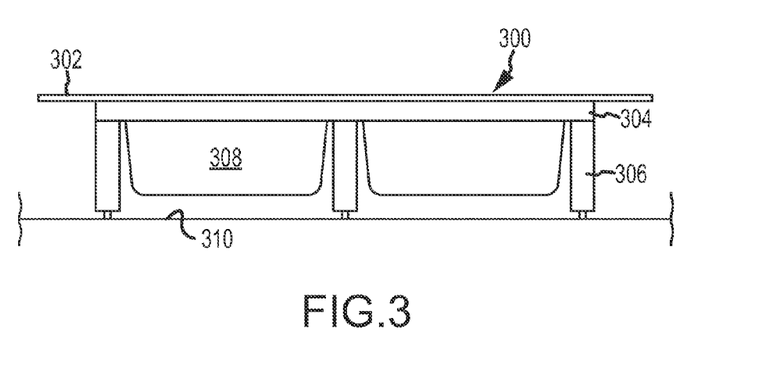
FIG. 3 shows a back view of the deck system of FIG. 1A.

As noted above, the storage bins are preferably suspended from the deck so that the bottom of each of the bins is spaced a vertical distance from the deck of the pickup truck. This is shown in FIG. 3. Specifically, the storage bins 308 are suspended from the deck 302 which, in turn, is supported on horizontal members 304 and support legs 306, which rest on the pickup deck 310. The horizontal members 304, support legs 306 and storage bins 308 are configured so that the bottom of the storage bins 308 is separated from the surface of the deck 310. In this manner, large or long items such as plywood, pipes, ropes, certain sporting gear and the like can be stored on the deck 310 beneath the bins 308. The legs may be dimensioned so that the deck is positioned above the wheel wells and below the top of the bed sidewalls. Moreover, different leg heights and different bin depths may be utilized to vary the spacing between the bed surface and the bin bottoms.

Figure 4:
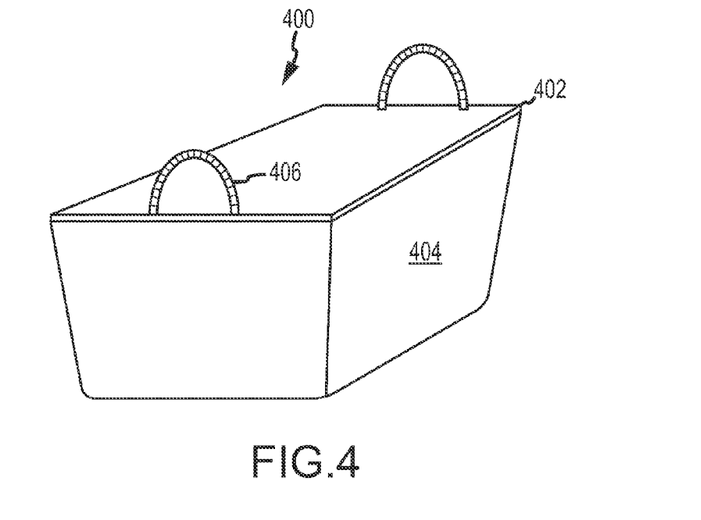
FIG. 4 shows a storage bin for use in the deck system of FIG. 1A.

FIG. 4 shows an example of a storage bin system 400 that can be used in connection with the systems as described above. The illustrated system 400 includes a body 404, generally in the shape of a storage tub, for receiving items therein and a circumferential flange 402. The flange 402 allows the system 400 to be supported within an opening of the deck, as will be described in more detail below. The illustrated system 400 may further include integrated and/or flexible handles 406 that allow the system 400 to be removed from and inserted into openings in the deck. In this manner, a user can conveniently take the storage system 400 from the pickup truck or other vehicle. This may be convenient, for example, to take small pieces or tools to a work site, to carry groceries or other merchandise to a desired location or for any other desired purpose. The handles 406, which may be made, for example, from rope, flexible straps or hinged, rigid grips, collapse (as indicated by arrow 401) when not being used so as to not interfere with closing of the associated hatch.

Figure 5:
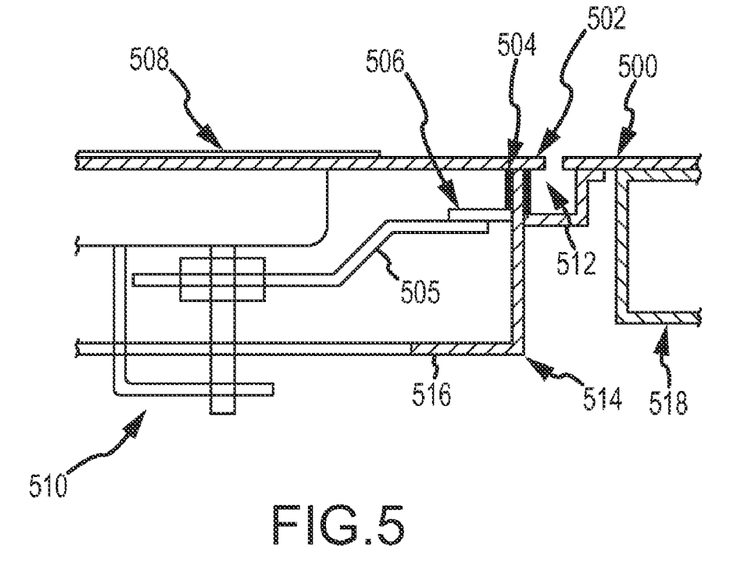
FIG. 5 is a side cross-sectional view of a portion of an interface between a hatch and the deck of the deck system of FIG. 1A.

FIG. 5 shows one possible configuration of the interface between the deck 500 and a hatch 502. As discussed above, there are a number of desirable attributes for this interface. First, for many applications, it is desired that the deck 500 and hatches 502 provide a substantially flat surface to facilitate storage and transport of items thereon. In addition, it is desirable to provide some degree of weather proofing with respect to the storage bin supported by the deck 500. In addition, it is desirable that the hatches 502 be securely closed and, most preferably, locked for security of the items stored therein.

Interchangeable storage bins may be used by the user for enhanced convenience. For example, a private user may keep business tools and supplies in the deck system during the week. On the weekend, those bins may simply be exchanged for bins containing hunting supplies, camping supplies, ski gear, etc. As another example, in a business fleet environment, bins may be pre-loaded with materials for the next day's jobs while a vehicle is out in the field. The bins can then simply be exchanged when the vehicle returns. Moreover, each bin or set of bins can provide the materials or equipment needed for a particular job. Thus, if rescheduling becomes necessary, a vehicle can be readily re-stocked as appropriate. Thus, bins may be provided separately or in quantities greater than the number of hatches. Moreover, separate covers for the bins may be provided for protection and stacking when the bins are removed form the deck system. The bins may also be covered in use for additional weather resistance.

FIG. 5 shows one possible arrangement in this regard. Specifically, the deck 500, which is supported on framework 512, includes a depending hatch support structure 514. The deck 500 has a number of openings that generally correspond to the dimensions of the hatches 502. Around the periphery of these openings, the illustrated deck includes depending structure 514 defining a rain gutter 512 and a rim 516 for supporting the flange of the storage container. In the illustrated embodiment, this structure 514 further includes a tongue catch 506 for catching a tongue 505 of the latch mechanism 510 associated with the locking latch handle 508. When the hatch is in the closed configuration as shown, the hatch 502 butts against the structure 514 of the deck 500. As shown, a resilient material coating 504 may be provided to cushion the contact interface and provide improved weather-proofing of the storage container. For example, this may be formed from plastic (e.g., PVC), rubber, EDPM, neoprene, etc. A similar material may be provided as a weather resistant gasket around the edges of the deck and at the interfaces between the handle faceplate and the hatch and between the rim 516 and the storage bins.

Interchangeable storage bins may be used for enhanced convenience. For example, a private user may keep business tools and supplies in the deck system during the week. On the weekend, those bins may simply be exchanged for bins containing hunting supplies, camping gear, ski equipment, etc. As another example, in a business fleet environment, bins may be pre-loaded with materials for the next day's jobs while a vehicle is out in the field. The bins can then simply be exchanged when the vehicle returns. Moreover, each bin or set of bins can provide the materials or equipment needed for a particular job. Thus, if re-scheduling becomes necessary, a vehicle can be readily re-stocked as appropriate. Accordingly, bins can be provided separately or in quantities greater than the number of hatches. Moreover, separate covers for the bins may be provided for protection and stacking when the bins are removed from the deck system.

During assembly and/or disassembly the illustrated deck system requires no customization(s) and/or modification(s) (e.g. cutting, drilling, bolting, etc.) to the vehicle's bed. Because the deck, framework, rear hatch, separator panels, and storage bins are designed to fit the geometry of each specific vehicle's bed, the deck system self-secures to the vehicle, preventing it from needing to be fastened and/or secured directly to the vehicle. However, fasteners may optionally be utilized for securing the deck system to a vehicle, for example, where the deck system is not fitted to the vehicle bed as described above. For example, non-penetrating clamps or turn buckles may be utilized in this regard.

Because the deck system requires no customization(s) and/or modification(s) to the vehicle's bed, does not need to be fastened and/or secured directly to the vehicle, can be separated into two sides, and includes the added flexibility of the adjustable framework, the assembly and disassembly of the deck system is very simple and requires very little time and no tools.

For assembly where the deck is formed in one segment, the user attaches the supporting legs to the lengthwise members of the framework using the supplied fasteners (e.g. bolts and nuts or pins), places the deck in the vehicle's bed, fastens the deck to the vehicle's bed using the supplied fasteners (e.g. non-penetrating clamps or turn buckles), secures the separator panels using supplied fasteners (e.g. thumb screws w/ shoulders), secures the rear hatch, and inserts the storage bins into the deck hatch openings.

For disassembly, the user simply removes the storage containers from the deck, unsecures the separator panels by removing the installed fasteners (e.g. thumb screws w/shoulders), unsecures the rear hatch, and unsecures and removes the deck from the bed by removing the installed fasteners (e.g. non-penetrating clamps or turn buckles).

For assembly where the deck is formed in two (or more) segments, the user attaches the supporting legs to the lengthwise members of the framework using the supplied fasteners (e.g. bolts and nuts or pins), places the each segment of the deck in the vehicle's bed, fastens the two segments of the deck together using the supplied fasteners (e.g. bolts and nuts or pins), fastens the crosswise members of the framework to the underside of the each segment of the deck using the supplied fasteners (e.g. bolts and nuts or pins), fastens the deck to the vehicle's bed using the supplied fasteners (e.g. non-penetrating clamps or turn buckles), secures the separator panels using supplied fasteners (e.g. thumb screws w/ shoulders), secures the rear hatch, and inserts the storage bins into the deck hatch openings.

For disassembly, the user simply removes the storage containers from the deck, unsecures the separator panels by removing the installed fasteners (e.g. thumb screws w/shoulders), unsecures the rear hatch, unsecures the crosswise members of the framework from the deck segments by removing the installed fasteners (e.g. bolts and nuts or pins), unsecures each deck segment from one another by removing the installed fasteners (e.g. bolts and nuts or pins), and unsecures and removes the deck from the bed by removing the installed fasteners (e.g. non-penetrating clamps or turn buckles).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. An apparatus for use in enhancing the utility of a bed area of a motorized vehicle, comprising:

secondary surface structure defining a secondary surface dimensioned to generally correspond to at least a portion of a primary bed surface of said motorized vehicle;

support structure, separate from a bed and wheel wells of said motorized vehicle, including support legs supported on said bed of said motorized vehicle, for supporting said secondary surface structure in a raised, separated position in relation to said primary bed surface so that at least one storage space is defined between said secondary surface structure and said primary bed surface, said legs being dimensional so that the secondary surface structure is positional above the wheel wells; and access structure, supportably associated with said surface structure, defining a plurality of access ports for accessing storage spaces so as to introduce or remove storage items in relation to said plurality of storage spaces, wherein said access structure comprises a depending structure connected to said surface structure and disposed below said surface structure and opposite said secondary surface, and wherein the depending structure is adapted to support at least one storage bin that is removably suspended therefrom.

2. The apparatus as set forth in claim 1, wherein said motorized vehicle comprises a pickup truck and said secondary surface structure is dimensioned to be received substantially in a bed of said pickup truck.

3. The apparatus as set forth in claim 1, wherein said support structure is effective to be securely received within a bed of said motorized free from penetration of any surface of said vehicle for the purpose of securing said support structure thereto.

4. The apparatus as set forth in claim 1, wherein said support structure includes a hinged cover movable between a first position to allow access to said storage space and a second position to substantially enclose said storage space.

5. The apparatus as set forth in claim 4, wherein said cover is hinged to pivot about an axis generally extending from front-to-back in relation to said primary bed surface of said motorized vehicle so as to facilitate access to said storage base from a side of said vehicle.

6. The apparatus as set forth in claim 1, wherein said access structure defines a rear hatch for accessing said storage space from a rear opening disposed between said secondary surface structure and said primary bed surface.

7. The apparatus as set forth in claim 1, wherein said secondary surface structure is disposed beneath a stop of a side wall of said bed area of said vehicle.

8. A motorized vehicle, comprising:
a cargo bed having a bed surface;
at least one removable storage bin depending from said bed, wherein said storage bin comprises a body and a circumferential flange, and wherein said circumferential flange is disposed below said bed and opposite said bed surface; and
access structure defining an access port extending through said bed surface for accessing said storage bin.

9. The motorized vehicle as set forth in claim 8, wherein said bed surface is a secondary surface disposed in a raised, separated position in relation to a primary bed surface of said vehicle, said vehicle being a pickup truck, and said secondary surface is dimensioned to be received substantially in a bed of said pickup truck.

10. The motorized vehicle as set forth in claim 8, wherein said secondary surface is effective to be securely received within a bed of said motorized vehicle free from penetration of any surface of said vehicle, for the purpose of securing said secondary surface thereto.

11. The motorized vehicle as set forth in claim 9, wherein said access structure includes a hinged cover movable between a first position to allow access to said storage bin and a second position to substantially enclose said storage bin.

12. The motorized vehicle as set forth in claim 8, wherein said access structure defines multiple access ports for accessing multiple storage bins.

13. The motorized vehicle as set forth in claim 9, wherein said access structure defines a rear hatch for accessing storage space from a rear opening disposed between said secondary surface structure and said primary bed surface.

14. A method for use in enhancing the utility of a bed area of a motorized vehicle, comprising the steps of:
providing a secondary surface structure defining a secondary surface dimensioned to generally correspond to a primary bed surface of said motorized vehicle, wherein said secondary surface structure comprises a plurality of access ports therethrough;
disposing said secondary surface structure in said bed area of said motorized vehicle so that said secondary surface is supported by legs separate from wheel wells of said vehicle, on said primary bed surface in a raised, separated position in relation to said primary bed surface above said wheel wells; and
inserting a storage bin through one of the access ports so that said storage bin is suspended by the secondary surface structure, wherein as suspended, a circumferential flange of said storage bin is disposed below the secondary surface structure opposite said secondary surface.

15. A method as set forth in claim 14, wherein said step of providing comprises providing a first portion of said secondary surface structure and providing a second, separate portion of said secondary surface structure, and said step of disposing comprises placing said first portion of said secondary surface structure in said bed area of said motorized vehicle, placing said second portion of said secondary surface structure into said bed area of said motorized vehicle, and attaching said first and second portions of said secondary surface structure.

16. A method as set forth in claim 14, further comprising the step of securing said secondary surface structure to a bed of said motorized vehicle free from penetration at any surface of said motorized vehicle for the purpose of securing said secondary surface structure thereto.

17. A method of using a motorized vehicle, comprising the steps of:
providing a secondary surface structure defining a secondary surface dimensioned to generally correspond to a primary bed surface of said motorized vehicle, wherein said secondary surface is disposed on legs in a raised, separated position in relation to said primary bed surface to define a storage space between said primary and secondary surfaces;
opening a first cover to expose a first opening extending through said secondary surface;
inserting a first storage bin having first dimensions through said first opening into said storage space, where said first storage bin is supported above said primary bed surface proximate to said first opening, and where a circumferential flange of said first storage bin is disposed below said secondary surface structure and opposite said secondary surface;
closing said first cover to substantially enclose said first storage bin;
opening a second cover to expose a second opening extending through said secondary surface;
inserting a second storage bin having second dimensions different than said first dimensions, through said second opening into said storage space, where said second storage bin is supported above said primary bed surface proximate to said second opening; and closing said second cover to substantially enclose said second storage bin.

18. A method as set forth in claim 17, further comprising the step of locking at least one of said first and second covers in a closed position.

19. A method as set forth in claim 17, further comprising the step of removing said first storage bin from said first opening and inserting a third storage bin, different from said first and second storage bins into said first opening.

20. The motorized vehicle as set forth in claim 11, wherein said hinged cover comprises a hinged cover surface, and wherein said hinged cover surface is co-planar with the bed surface when said hinged cover is in said second position.

21. The motorized vehicle as set forth in claim 20, wherein said hinged cover comprises a latch mechanism for removably connecting said hinged cover to said access structure, and wherein said latch mechanism is disposed below said bed and opposite said bed surface.

22. The motorized vehicle as set forth in claim 11, wherein said hinged cover comprises a latch mechanism for removably connecting said hinged cover to said access structure, and wherein said latch mechanism is disposed below said bed and opposite said bed surface.

* * * * *

UNITED STATES PATENT AND TRADEMARK OFFICE
CERTIFICATE OF CORRECTION

PATENT NO. : 8,210,591 B2  
APPLICATION NO. : 13/280230  
DATED : July 3, 2012  
INVENTOR(S) : Dave Martin Page 1 of 1

It is certified that error appears in the above-identified patent and that said Letters Patent is hereby corrected as shown below:

Column 11, line 46, delete "stop" and insert therefor --top--

Signed and Sealed this  
Nineteenth Day of February, 2013

Teresa Stanek Rea  
*Acting Director of the United States Patent and Trademark Office*